May 20, 1952      J. ANGELO      2,596,974
UTILITY ATTACHMENT FOR FISHING CREELS
Filed July 14, 1947
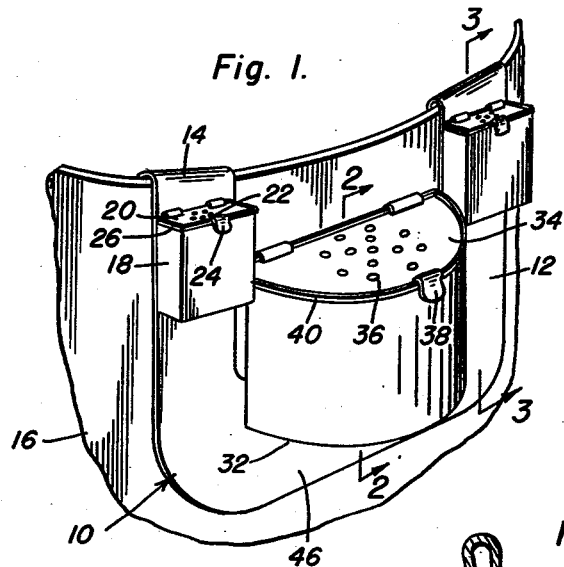
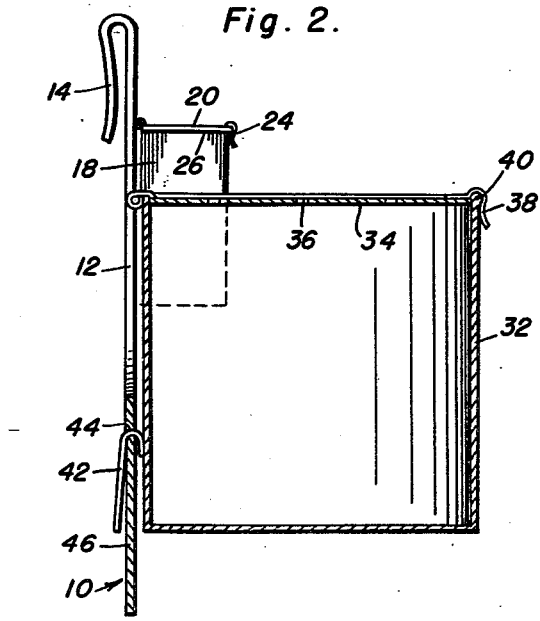
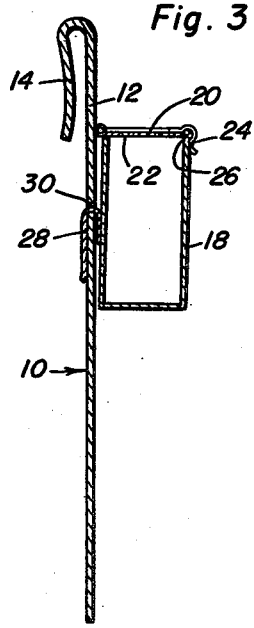
Inventor
Joseph Angelo Patented May 20, 1952

2,596,974

UNITED STATES PATENT OFFICE 2,596,974

UTILITY ATTACHMENT FOR FISHING CREELS

Joseph Angelo, North Plainfield, N. J.

Application July 14, 1947, Serial No. 760,713

3 Claims. (Cl. 220—18)

This invention relates to new and useful improvements in utility attachments for fishing creels and the primary object of the present invention is to provide a device which is quickly and readily applied to a fishing creel, including a plurality of receptacles that conveniently receive live bait, dead bait, and such other articles that may be necessary for use in fishing.

Another important object of the present invention is to provide an attachment for fishing creels, baskets and the like so designed as to equally balance the article to which the same is applied.

A further object of the present invention is to provide a device of the foregoing character wherein the receptacles are conveniently removed from the supporting element for cleaning, insertion of bait, repair, replacement, or the like.

A still further aim of the present invention is to provide a device that is simple and practical in construction, strong and reliable in use, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a fragmentary perspective view of a fishing creel showing the present invention applied thereto;

Figure 2 is a transverse vertical sectional view taken substantially on the plane of section line 2—2 of Figure 1; and Figure 3 is a transverse vertical sectional view taken substantially on the plane of section line 3—3 of Figure 1.

Referring now to the drawings in detail, wherein, for the purpose of illustration, there is disclosed a preferred embodiment of the present invention, the numeral 10 represents a substantially U-shaped member generally, the legs 12 of which terminate in resilient hooks or clips 14 that engage one edge of a fishing creel or the like 16.

The numeral 18 represents a pair of receptacles each having hinged closures or covers 20 provided with air vents 22. Spring clips 24 carried by the free outer edge of covers 20 engage a beading 26 about the upper edge of the receptacles for normally holding the covers in a closed position relative to the receptacles.

Fixedly secured to each of the receptacles 18 is one leg of a resilient U-shaped clip 28 having its free end elongated to engage apertures 30 provided in the leg portions 12 of member 10 to hold the receptacles in position with the member 10.

The numeral 32 represents a preferably semicircular live bait receptacle provided with a hinged closure or cover 34 having air vents 36. This cover 34 is provided with a spring or resilient clip 38 that engages a peripheral beading 40 at the upper edge of the receptacle for normally holding the cover in a closed position relative to the receptacle.

Fixedly secured to the receptacle 32 adjacent its lower end is one terminal portion of a resilient clip or spring 42 substantially U-shaped in form and having its free terminal portion elongated to extend through a central aperture 44 provided in the web portion 46 of the member 10.

The arrangement of the receptacles 18 and 32 on the member 10 is such as to balance the same when applied to a fishing creel without in any way interfering with the normal use of the creel.

In view of the foregoing description taken in conjunction with the accompanying drawings, it is believed that a clear understanding of the device will be quite apparent to those skilled in this art. A more detailed description is accordingly deemed unnecessary.

It is to be understood, however, that even though there is herein shown and described a preferred embodiment of the invention, the same is susceptible to certain changes fully comprehended by the spirit of the invention as herein described and within the scope of the appended claims.

Having described the invention, what is claimed as new is:

1. A utility attachment for fishing creels comprising a flat substantially U-shaped base member, integral resilient hooks at the adjacent ends of said member for engaging a fishing creel, a live bait receptacle, a single resilient clip carried by said receptacle, an aperture provided in substantially the center of said member yieldingly receiving said clip, a plurality of bait receptacles, further resilient clips carried by said last-mentioned receptacles, and further apertures provided in said base member receiving said further clips.

2. A utility attachment for fishing creels comprising a flat substantially U-shaped base member having terminal hooks for yieldingly gripping a fishing creel, the web of said base member having a central opening, a main receptacle having a single resilient clip secured to its lower portion and received in said central opening and yieldingly gripping said base member for retaining the main receptacle relative to the base member, said base member having a pair of openings therein adjacent said hooks and spaced equidistance from said central opening, and a pair of auxiliary receptacles each having a single spring clip secured thereto and received in said pair of openings and yieldingly gripping the base member said main receptacle being considerably larger than the auxiliary receptacles and extending upwardly between said auxiliary receptacles.

3. A utility attachment for fishing creels comprising a flat substantially U-shaped base member including spaced parallel leg portions and a web portion joining said leg portions, depending hooks forming part of said leg portions and adapted to engage over the upper edge of a creel, the web portion of said base member having a central opening therein, a main receptacle having a single depending resilient clip secured to its lower portion and extending through said central opening, said main receptacle being open at its upper end, a closure hinged to said main receptacle for vertical swinging movement and including a means for retaining the closure in its closed position, said leg portions having horizontal slots therein adjacent said hooks, a pair of auxiliary receptacles, a single depending spring clip secured to each of said auxiliary receptacles and received in said slots to support said auxiliary receptacles upon the leg portions of said base member, said main receptacle being considerably larger than said auxiliary receptacles and extending upwardly from said web portion between said auxiliary receptacles, and a vertically swinging closure for each of said auxiliary receptacles.

JOSEPH ANGELO.

REFERENCES CITED

The following references are of record in the file of this patent:

UNITED STATES PATENTS

| Number | Name | Date |
| --- | --- | --- |
| 594,448 | Webber | Nov. 30, 1897 |
| 666,941 | Strait | Jan. 29, 1901 |
| 767,675 | Alexander | Aug. 16, 1904 |
| 802,405 | Neuenfeldt | Oct. 24, 1905 |
| 886,337 | Balken | May 5, 1908 |
| 963,285 | Fly | July 5, 1910 |
| 1,427,219 | Mabon | Aug. 29, 1922 |
| 1,476,230 | Thompson | Dec. 4, 1923 |
| 1,750,624 | Buedingen | Mar. 18, 1930 |
| 1,949,792 | Etherton | Mar. 6, 1934 |
| 2,149,612 | Madsen | Mar. 7, 1939 |